US006952809B2

(12) United States Patent  
Beranek et al.

(10) Patent No.: US 6,952,809 B2
(45) Date of Patent: Oct. 4, 2005

(54) METHOD AND APPARATUS FOR NAVIGATING A WINDOWED OPERATING ENVIRONMENT

(75) Inventors: Michael Joseph Beranek, Lake Villa, IL (US); Richard Darren Popik, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 09/821,945

(22) Filed: Mar. 30, 2001

(65) Prior Publication Data

US 2002/0171680 A1 Nov. 21, 2002

(51) Int. Cl.[7] .............................................. G06F 3/00
(52) U.S. Cl. ..................... 715/856; 715/764; 715/700; 345/157; 382/156; 600/372; 600/378
(58) Field of Search ................................ 715/700, 764, 715/856; 345/156, 157, 700, 764, 856; 382/155–157; 600/372, 378, 544, 373, 382, 383, 384; 128/920, 925

(56) References Cited

U.S. PATENT DOCUMENTS

| | | | |
|---|---|---|---|
| 3,986,030 A | 10/1976 | Teltscher | 607/116 |
| 4,030,141 A | 6/1977 | Graupe | 607/122 |
| 4,158,196 A | 6/1979 | Crawford, Jr. | 29/869 |
| 4,245,645 A | 1/1981 | Arseneault et al. | 250/349 |
| 4,711,027 A | 12/1987 | Harris | 600/378 |
| 4,800,893 A * | 1/1989 | Ross et al. | 600/545 |
| 5,382,956 A * | 1/1995 | Baumgartner et al. | 341/155 |
| 5,609,622 A | 3/1997 | Soukup et al. | 340/825.19 |
| 5,638,826 A * | 6/1997 | Wolpaw et al. | 600/544 |
| 5,692,517 A * | 12/1997 | Junker | 600/545 |
| 5,843,147 A | 12/1998 | Testerman et al. | 623/25 |
| 6,066,163 A * | 5/2000 | John | 607/45 |
| 6,171,239 B1 * | 1/2001 | Humphrey | 600/372 |
| 6,560,486 B1 * | 5/2003 | Osorio et al. | 607/45 |
| 6,626,676 B2 * | 9/2003 | Freer | 434/236 |

OTHER PUBLICATIONS

Mitsuru Murakami et al, "Development of a Painting Device Using EMG Signals", May 12, 2000, Nippon Kikai Gakkai Robotikusu, Mekatoronikusu Koenki Koen Ronbunshu, vol. 2000, No. Pt. 4, p. 2P1.12.013 (1–2).*

Toby Howard, "Controlling computers by thought", Feb. 1999, Personal Computer World magazine.*

"Letters", Nov. 1999, The Hastings Center Report, 29, 6, 4.*

Jong Dae Park et al, Implementation of Four–subject Four–channel Optical Telemetry System with Enforced Synchronization Jul. 1998, Journal of the institute of Electronics Engineers of Korea, vol. 35–D, No. 7, p. 40–47.*

Jeff Symons et al, "Electromyography and Acceleration of the Trunk as Trigger Sources for Implantable Gait Stimulation", 1985, Rehabilitation Eng. Soc. North America, Washington, DC, p. 385–387.*

Yoshiaki Yamada et al., "Two–dimensional jaw tracking and EMG recording system implanted in the freely moving rabbit", Apr. 1988, Journal of Neuroscience Methods, p. 257261.*

B. Mitchener, "Controlling a Computer by the Power of Thought," The Wall Street Journal, Mar. 14, 2001, pp. B1, B4.

* cited by examiner

Primary Examiner—X. L. Bautista
(74) Attorney, Agent, or Firm—John R. Pivnichny

(57) ABSTRACT

A person having one or more implanted or surface attached electrodes navigates a window environment. Signals from the electrodes are attached to input circuits in a control circuit which includes a sequential digital control circuit. The control circuit is coupled to a processor running window environment software and having a display. While observing the display, the person is able to activate signals by activating or relaxing a muscle or by mental processes such as thought, to thereby navigate the software environment.

1 Claim, 2 Drawing Sheets

METHOD AND APPARATUS FOR NAVIGATING A WINDOWED OPERATING ENVIRONMENT

TECHNICAL FIELD

The invention relates to a method of navigating a windowed operating environment without using a conventional pointing device. More particularly, the present invention relates to an interface system that permits a handicapped or any other individual to operate a system for positioning a pointer and clicking a selection button on a computer display screen without having to move a mouse, trackball or other type of input device.

BACKGROUND OF THE INVENTION

Various special purpose systems have been developed which use surface or implanted electrodes to allow primarily handicapped individuals to control prosthetic devices such as artificial limbs. For example, Graupe in U.S. Pat. No. 4,030,141 describes a method for actuating a prosthetic device from a single pair of electrodes. The electrodes provide electromyographic (EMG) signals which are processed and delivered to a control circuit for electrically activating a prosthetic appliance.

Harris in U.S. Pat. No. 4,711,027 describes a method of constructing a fluid tight assembly of an electrode along the length of an implantable lead. Soukup et al. in U.S. Pat. No. 5,609,622 describe another type of implantable electrode shaped as a helically wound conductor. Testerman et al. describe an implantable eyelid electrode. However their electrode is used for stimulating eyelid motion in a person having hemifacial paralysis.

Crawford, Jr. in U.S. Pat. No. 4,158,196 describes a system for converting bioelectric activity, EMG signals, to serve as an input to a computer, microprocessor, discrete logic network or any system using digital input signals. The system also converts digital signals into electrical stimuli which are applied to a second set of electrodes. A control unit uses the sensed and stimulated signals for controlling a wheelchair.

In a different approach, Teltscher in U.S. Pat. No. 3,986,030 describes a method for selecting keys of a typewriter or keys of a piano. Light rays reflected by eye motion activate light responsive sensors. With this system someone e.g. a quadriplegicly affected person can operate the keys without movement of arms or legs.

None of the aforementioned devices and methods, however, addresses navigating a window environment which is normally accomplished by moving a mouse or trackball device.

In accordance with the teachings of the present invention there is defined a new method and apparatus for navigating a windows environment without use of a mouse or trackball device or the like. It is believed that such a method and apparatus would constitute a significant advancement in the art.

OBJECTS AND SUMMARY OF THE INVENTION

It is therefore a principal object of the present invention to enhance the window navigation art by providing a system with enhanced capabilities.

It is another object to provide such a system wherein enhanced operational capabilities are possible.

It is a further object of the invention to provide a method of navigating a window environment which can be accomplished in an enhanced manner.

These and other objects are attained in accordance with one embodiment of the invention wherein there is provided a system for navigating in a window environment, comprising, a processor having a display, and window environment software installed on the processor, a sequential digital control circuit coupled to the processor, the control circuit adapted to positioning a pointer and making a selection within a window on the display in response to input circuits, and a plurality of the input circuits coupled to the digital control circuit, the input circuits adapted to receive electromyographic signals.

In accordance with another embodiment of the invention there provided a navigating apparatus, comprising, a processor having a display, and window environment software installed on the processor, a sequential digital control circuit coupled to the processor, the control circuit adapted to positioning a pointer and making a selection within a window on the display in response to input circuits, a plurality of the input circuits coupled to the digital control circuit, the input circuits adapted to receive neurotropic electrode signals, and a chip having a plurality of neurotropic electrodes, the chip connected to the plurality of the input circuits.

In accordance with yet another embodiment of the invention there is provided a method of navigating within a window environment, the method comprising the steps of, displaying a pointer within a window on a processor display attached to a processor, the processor running window environment software, receiving a plurality of electromyographic signals by a plurality of input circuits coupled to a sequential control circuit, whereby the control circuit is coupled to the processor, and operating the sequential control circuit in response to the plurality of input circuits to position the cursor or make a selection within said window.

BEST MODE FOR CARRYING OUT THE INVENTION

For a better understanding of the present invention, together with other and further objects, advantages, and capabilities thereof, reference is made to the following disclosure and the appended claims in connection with the above-described drawings.

Figure 1:
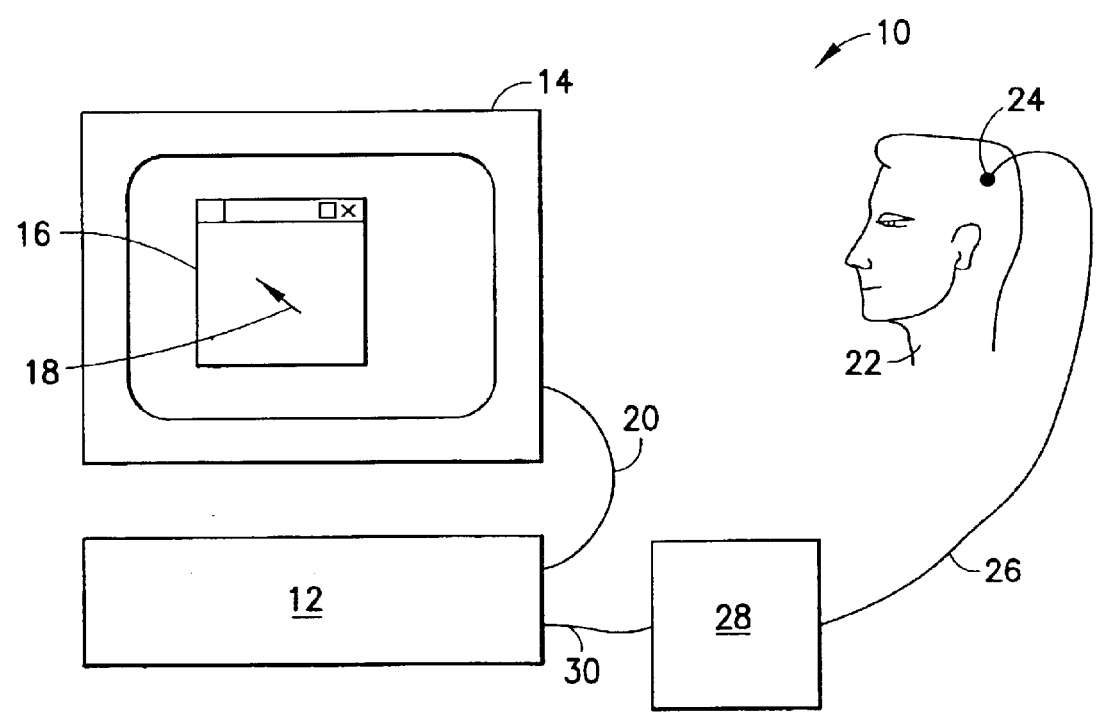
FIG. 1 illustrates the various elements of a navigating system.

In FIG. 1 there is shown a system 10 for navigating in a window environment. The term navigating shall be taken herein to mean movement or positioning of a pointer on a display and making a selection of an item on the display that is located at the current position of the pointer. The pointer may be positioned anywhere on the display whether within or outside defined window area. Processor 12 has a display 14 and has window environment software installed. The processor may be any type of computer, mainframe, desktop, tower, laptop, palmtop or other type of computing device or microprocessor capable of running window environment software and operating display 14. The software may be an operating system having a graphical user interface (GUI). It may also be a graphical or drawing software application installed on processor 12.

Display 14 may be an integral part of processor 12 such as the display of a laptop, palmtop, cellphone or other computing device, more typically display 14 is mounted in a separate mechanical structure attached to processor 12 via cable 20. A windows environment is shown 16 on the face of display 14 including a moveable pointer 18. A person 22 is positioned within viewing distance of display 14.

The person 22 may be a handicapped individual who can observe but has no ability to operate a mouse or other pointing and selecting input device in order to navigate the window environment shown on display 14. Person 22, however, may be any individual, whether handicapped or not, who desires to navigate the window environment.

A surface or implanted electrode 24 is located on or within person 22. The electrode may be adapted for receiving electromyographic signals generated on or within person 22. The signals are within the conscious control of the person so as to be activated and deactivated at will. Electrodes may be located on any part of the body of person 22 including skin, brain, muscle tissue or eyelid etc.

Electrode 24 may comprise a chip implanted in the brain having neurotropic electrodes capable of receiving signals generated through mental processes such as thought, by person 22. In one embodiment a two signal chip comprises two neurotropic electrodes on a chip structure capable of providing two signals. Person 22 may activate either of the signals. In the case of electrode 24 positioned in muscle tissue, person 22 may activate a signal by consciously flexing or relaxing the muscle.

Electrode 24 is connected via connection 26 to an input circuit of control circuit 28. Connection 26 may be an electrical connection using any electrically conductive wire material. It may also be any other apparatus or device for transferring signals from electrode 24 to control circuit 28. The input circuit typically samples, amplifies, and converts the electromyographic or neurotropic type signals to produce digital signals for use by a sequential digital control circuit of control circuit 28 which is coupled to processor 12 via connection 30.

The input circuit may also be configured to filter out repeated signals within a pre-specified time such as might be due to a lack of signal creating dexterity of a handicapped person. In addition to amplifying, the input circuit may also provide thresholding and signal processing of the signal generated by an electrode. The input circuit may also measure or process the duration of a signal or the time period between activated signals. The input circuit may also be constructed to operate in an adaptive manner to adjust the thresholding and signal processing automatically and thereby adapt over time to particular electromyographic or neurotropic signals.

Figure 2:
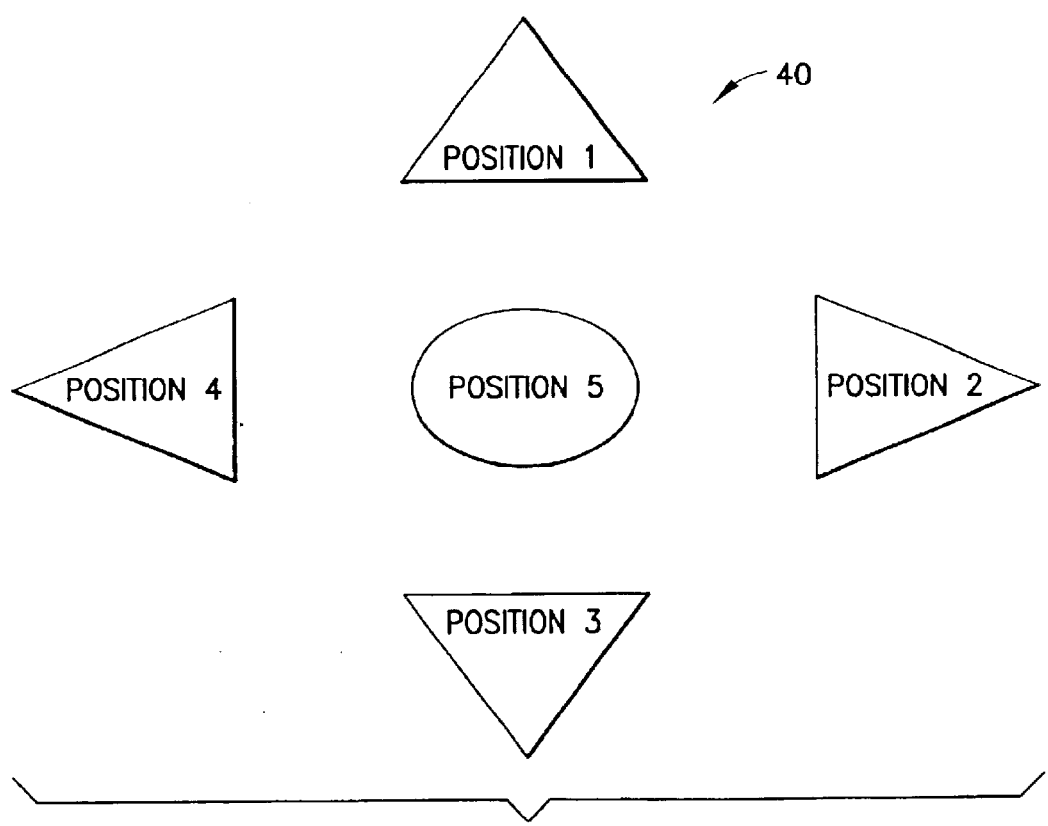
FIG. 2 shows one embodiment of operation of directional navigation and selection by a control circuit as used in the navigation system.

The operation of the sequential digital control circuit can best be explained with reference to FIG. 2. In the case where person 22 may activate one of two signals, the first signal advances an indexer 40 as shown in FIG. 2 by one for each signal received. For example, position 1 (move up) could be a starting point. Activating the first signal one time advances the index to position 2 (move right). After reaching position 4 (move left), another first signal advances the index to position 5 (select position). Thereafter another first signal resets the index to position 1.

Activation of the second signal causes a cursor movement or selection which is dependent or the current position of the index as explained on Table 1, below.

TABLE 1

| Index | Effects of each Signal 1 received/ | Effect of each Signal 2 received |
|---|---|---|
| Position 1 | Advance to Position 2 | Move mouse cursor up a predefined number of pixels, or to the next logical predefined up position |
| Position 2 | Advance to Position 3 | Move mouse cursor right a predefined number of pixels, or to the next logical predefined right position |
| Position 3 | Advance to Position 4 | Move mouse cursor down a predefined number of pixels, or to the next logical predefined down position |
| Position 4 | Advance to Position 5 | Move mouse cursor left a predefined number of pixels, or to the next logical predefined left position |
| Position 5 | Advance to Position 1 | Make a selection on current pointer position. |

The effect of each second signal activation will be observed by person 22 as the action affects the image presented on display 14. Means for indicating the current index position may be provided by various indications such as an arrow, or color dots, or the like also on display 14. Alternatively an index indication may be included in control circuit 28 without departing from this invention.

In the embodiment described above, control circuit 28 is adapted to respond to two input circuits. The response to the first input circuit is used for directional navigation and the second for selection of movement in the respective direction or selection comparable to a mouse click at the current position of a cursor 18 in window 16. Cursor 18 could also be located anywhere on display 14.

The above description of one embodiment of control circuit 28 is not intended to be limiting. Those of ordinary skill in the art will recognize that additional movement or selection states may be readily included in the indexer 40. For example, six, eight, ten or any number of directions may be included. Additional selection positions may also be included. For example one selection position may make a single click selection, another selection may be used for a double click selection, and a third selection position used for a right button selection.

Central circuit 28 performs the actions just described in a sequential digital control circuit which may comprise hardware logic circuits of any circuit family. A programmed microprocessor may also be used. Furthermore the program may be stored and executed in processor 12 without departing from the present invention.

Control circuit 28 may be coupled to processor 12 via any type of interconnection including but not limited to a keyboard or mouse port, serial port, bus interface, or infrared port. Processor 12 may run specially developed software as noted above to complete the cursor positioning and selection making on screen 14.

The person 22 may therefore navigate a window environment through activation of signals and observing the result on display 14 while using input circuit 28, and processor 12. As with any new system, a certain amount of time and effort may be needed for person 22 to learn how to operate the system and become proficient in its use. Specialized learning software may be provided in processor 12 to assist in the learning process such as practice drills in turning the signals on and off.

While there have been shown and described what are at present considered the preferred embodiments of the invention, it will be obvious to those skilled in the art that various changes and modifications may be made therein without departing from the scope of the invention as defined by the appended claims.

What is claimed is:

1. A system for navigating in a window environment, comprising:

a processor having a display, and window environment software installed on said processor, said software capable of displaying a pointer within a window on said display;

a chip having a plurality of neurotropic electrodes on the chip structure capable of receiving neurotropic signals generated through thought processes, said chip also having a corresponding plurality of input circuits connected on said chip to respective said plurality of neurotropic electrodes on said chip, said input circuits adapted to sample, amplify, and convert said neurotropic signals to produce corresponding digital signals, said input circuits also adapted to filter out repeated signals within a pre-specified time and for thresholding and signal processing said neurotropic signals in an adaptive manner; and a sequential digital control circuit coupled to said processor, and said digital signals from said input circuits, said control circuit adapted to positioning said pointer in said window on said display in response to said digital signals by advancing a positioning indexer by one for each signal received.

\* \* \* \* \*